United States Patent
Mori

[15] 3,665,779
[45] May 30, 1972

[54] AUTOMATIC SHIFT CONTROL SYSTEM FOR AUTOMATIC TRANSMISSION

[72] Inventor: Takakazu Mori, Toyota, Japan

[73] Assignee: Toyota Jidosha Kogyo Kabushiki Kaisha, Toyota-shi, Japan

[22] Filed: June 23, 1970

[21] Appl. No.: 49,013

[30] Foreign Application Priority Data

Oct. 13, 1969 Japan..................................44/81677

[52] U.S. Cl. ..................................................74/866
[51] Int. Cl. ..................................................B60k 21/00
[58] Field of Search......................................74/866

[56] References Cited

UNITED STATES PATENTS 2,671,351  3/1954  Neracher ..........................74/866 X
3,052,134  9/1962  Worster ............................74/866

*Primary Examiner*—Arthur I. McKeon
*Attorney*—Cushman, Darby & Cushman

[57] ABSTRACT

An automatic shift control system for a fluid controlled automatic transmission having a safety device for forcedly maintaining the hydraulic actuating circuit in the third speed position when the speed of the vehicle running at high speeds exceeds a predetermined setting so as to inhibit a downshift from third to second gear thereby to ensure safety and stable driving at high speeds.

14 Claims, 19 Drawing Figures

Patented May 30, 1972
3,665,779
11 Sheets-Sheet 1
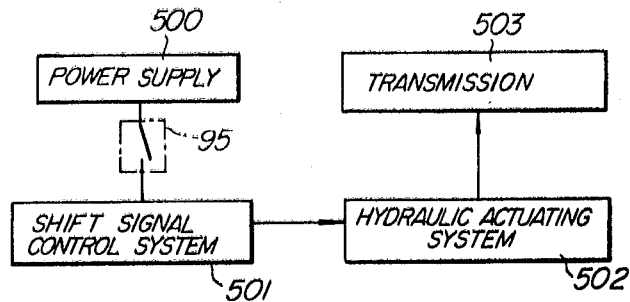
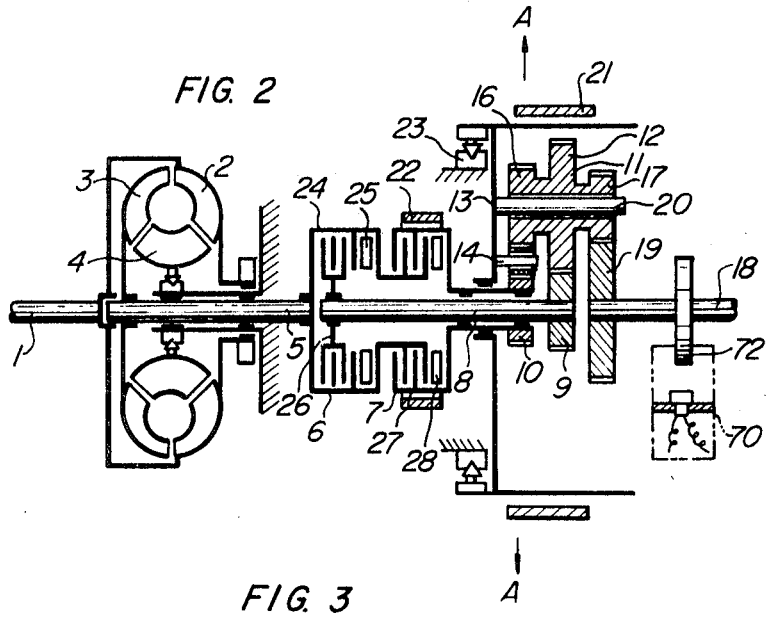
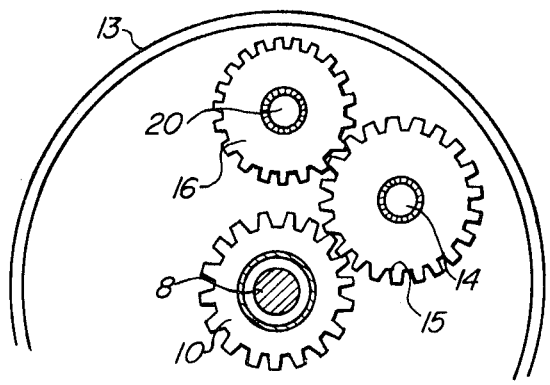
INVENTOR
BY
ATTORNEYS

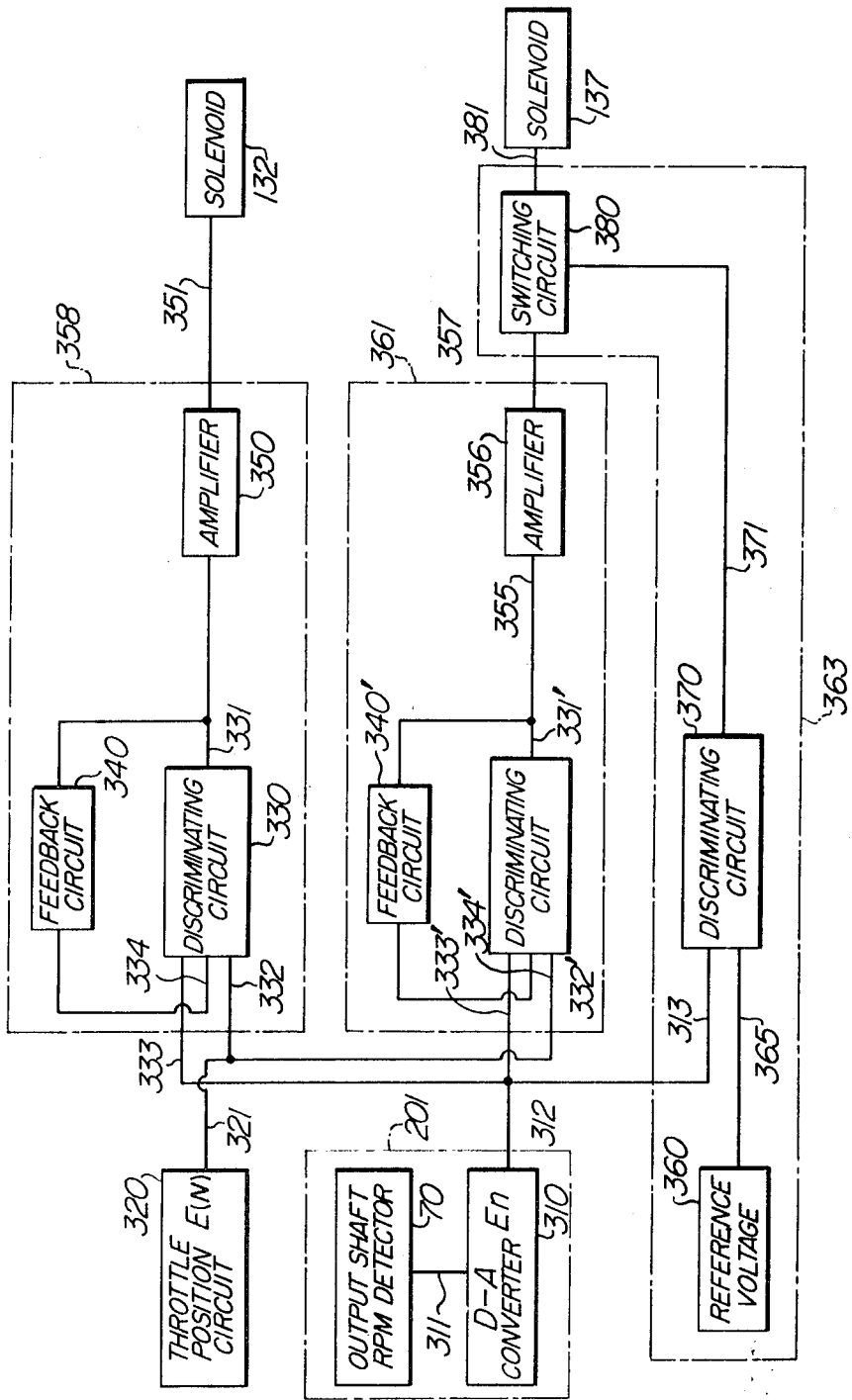

Patented May 30, 1972

INVENTOR:

BY
ATTORNEY:

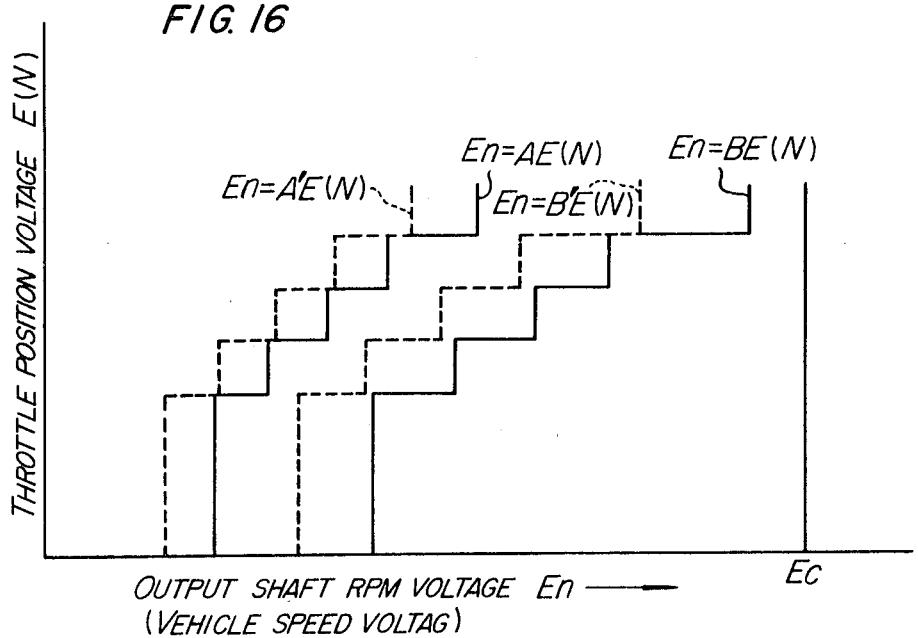
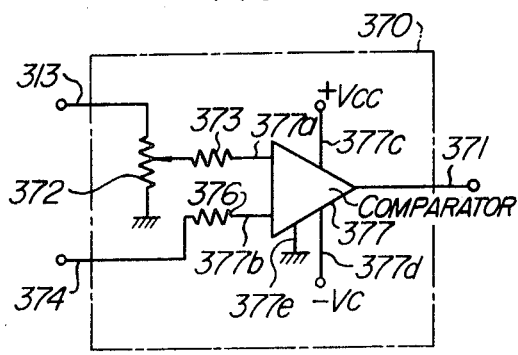
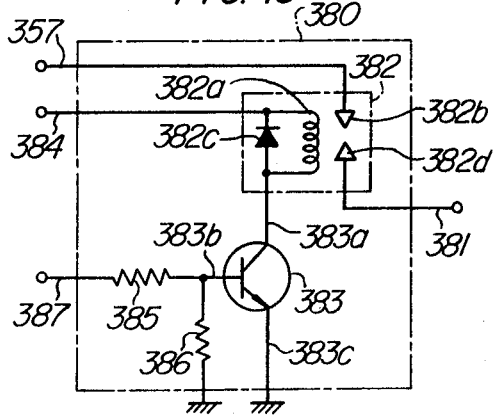

3,665,779

AUTOMATIC SHIFT CONTROL SYSTEM FOR AUTOMATIC TRANSMISSION

BACKGROUND OF THE INVENTION

1. FIELD OF THE INVENTION

This invention relates to automatic transmissions for vehicles and more particularly to an automatic shift control system comprising the combination of electrical and fluid control means for use in an automatic transmission.

2. DESCRIPTION OF THE PRIOR ART

Automatic transmissions generally employed heretofore invariably relied upon fluid pressure for carrying out all the complex controls including the shift control. Thus, the shift signal detection system in such an automatic transmission was generally complex in structure and the detected signals in the form of a fluid pressure differential were subject to errors and were therefore generally so inaccurate that accurate control was not possible. Recently, an electrically controlled shift signal control system has been developed as a very effective solution to the above defects and progressively put into practical use. However, such an electrically controlled shift signal control system has not been found completely satisfactory in that an erratic shift signal may be delivered accidentally to cause a shift suddenly with unexpected timing which results in a dangerous drive. This is very dangerous in respect of the safety of the drive especially when the trouble occurs during driving of the vehicle at high speeds.

SUMMARY OF THE INVENTION

It is an object of the present invention to provide a novel and improved automatic shift control system for an automatic transmission in which a safety device is added to an electrically controlled shift signal control system of the kind described above so that any erratic signal that may be delivered from the shift signal control system would not cause a downshift when the vehicle is running at a high speed which exceeds a predetermined setting.

More precisely, in an automatic transmission having an electrically controlled shift signal control system, it is quite likely that the shift signal control system delivers an erratic shift signal or ceases to deliver a correct shift signal due to external noise, disconnection of a wire or trouble occurring in a switch means for the on-off of an output signal. Such an erratic signal is undesirable from the viewpoint of driving safely at high speeds.

It is therefore another object of the present invention to provide an automatic shift control system for an automatic transmission in which the hydraulic actuating system is so arranged that possible delivery of such an erratic shift signal resulting in the off state of the electrical system may not affect the safe operation of the transmission, that is, the gear unit is prevented from being downshifted, and in which safety means are provided so that the power supplied to a solenoid which actuates the frictionally engaging means for accomplishing the meshing engagement of gears in the gear unit may be interrupted when the vehicle is running at a high speed which exceeds a predetermined setting, thereby to inhibit the solenoid from responding to the erratic shift signal, to prevent the undesirable downshift of gears during the high speed driving of the vehicle and to improve the stability and safety of drive at high speeds.

In accordance with one aspect of the present invention which attains the objects described above, there is provided, in an automatic transmission for an engine-driven vehicle having a hydraulic torque converter, a gear unit and frictionally engaging means for accomplishing the selective meshing engagement of the gears in said gear unit, an automatic shift control system comprising means for producing ratio changes by selectively actuating said frictionally engaging means, means for generating electrical signals for seeking the shifting conditions including means for generating an electrical signal responsive to the engine torque or throttle position and means for generating an electrical signal responsive to the r.p.m. of the output shaft or vehicle speed, at least one discriminating circuit for generating a shift signal for actuating said ratio-change producing means when the electrical signals generated by said signal generating means satisfy a predetermined condition, and at least one safety circuit means for forcedly maintaining said frictionally engaging means in the high speed position when the output shaft r.p.m. or vehicle speed exceeds a predetermined setting.

In accordance with another aspect of the present invention, there is provided, in an automatic transmission for an engine-driven vehicle having a hydraulic torque converter, a gear unit and frictionally engaging means for accomplishing the selective meshing engagement of the gears in said gear unit, an automatic shift control system comprising means for producing ratio changes by selectively actuating said frictionally engaging means, means for generating electrical signals for seeking the shifting conditions including means for generating an electrical signal responsive to the engine torque or throttle position and means for generating an electrical signal responsive to the r.p.m. of the output shaft or vehicle speed, at least one discriminating circuit for generating a shift signal for actuating said ratio-change producing means when the electrical signals generated by said signal generating means satisfy a predetermined condition, and at least one safety circuit means for disconnecting said ratio-change producing means from said discriminating circuit when the output shaft r.p.m. or vehicle speed exceeds a predetermined setting to cut off the supply of the electrical signal from said discriminating circuit to said ratio-change producing means so as thereby to forcedly maintain said frictionally engaging means in the high speed position.

The above and other objects, features and advantages of the present invention will be apparent from the following detailed description taken in conjunction with the accompanying drawings.

BRIEF DESCRIPTION OF THE DRAWING

FIG. 1 is a block diagram of an automatic transmission according to the present invention.

FIG. 2 is a schematic sectional view of a transmission unit to which the present invention is applied.

FIG. 3 is an enlarged sectional view taken on the line A—A in FIG. 2 with parts cut away to show in detail the relation between an idler gear not shown in FIG. 2 and the sun gear and planet pinion.

FIGS. 4 through 10 are diagrammatic views illustrating the operating state at various positions of a hydraulic actuating circuit employed in the present invention, wherein FIG. 4 illustrates the operating state at the N position, FIG. 5 the operating state at the D position — 1st speed, FIG. 6 the operating state at the D position — 2nd speed, FIG. 7 the operating state at the D position — 3rd speed, FIG. 8 the operating state at the 2 position — 2nd speed, FIG. 9 the operating state at the L position, and FIG. 10 the operating state at the R position.

FIG. 11 is a block diagram of a shift signal control system preferably used in the present invention.

FIG. 16 is a chart showing the relation between a signal representative of the output shaft r.p.m. and a signal representative of the throttle position for determining the shift regions according to the present invention.

FIG. 17 is a circuit diagram showing the structure of a discriminating circuit in a safety circuit in the shift signal control system for comparing the signal representative of the output shaft r.p.m. with a reference voltage.

FIG. 18 is a circuit diagram showing the structure of a switching circuit in the safety circuit for interrupting the supply of power to a solenoid in response to a signal delivered from the discriminating circuit shown in FIG. 17.

DESCRIPTION OF THE PREFERRED EMBODIMENT

Figure 4:
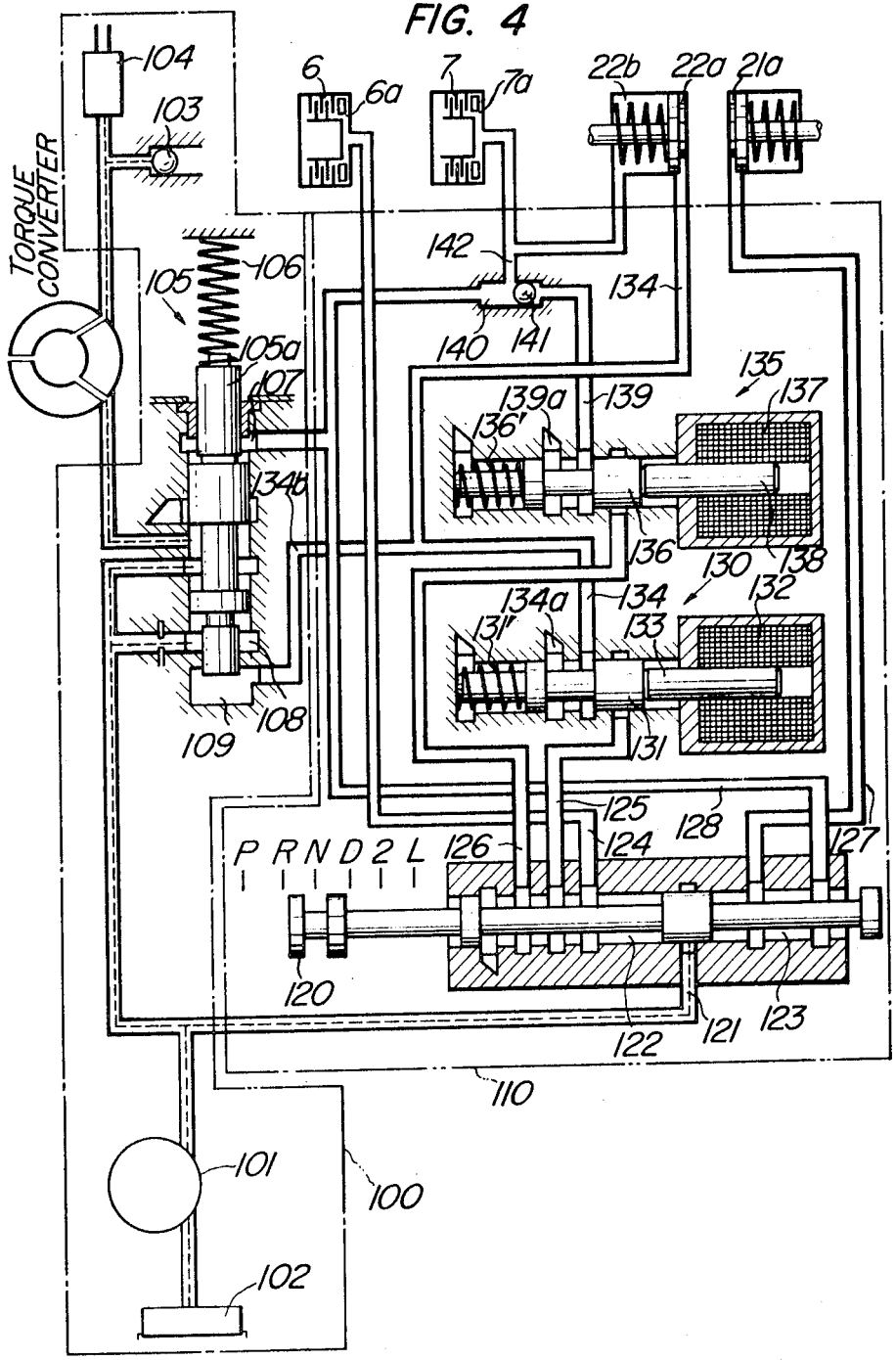

Referring to FIG. 1, the automatic transmission embodying the present invention is in a broad way composed of a source of electrical power supply 500, a shift signal control system 501, a switch 95 connecting the shift signal control system 501 with the electrical power source 500, a hydraulic actuating system 502, and a transmission unit 503. These components will be described in detail hereunder.

STRUCTURE OF TRANSMISSION

A torque converter automatic transmission having three forward speeds and one reverse speed as shown in FIG. 2 will be taken as a typical example of the automatic transmission. In FIG. 2, the structure of such a fluid controlled automatic transmission is schematically shown.

A torque converter unit includes a pump impeller 2 directly connected to a crankshaft 1 of an engine. The power developed by the engine is transmitted from the pump impeller 2 to a turbine impeller 3 through the medium of hydraulic fluid, and the fluid is returned to enter the pump impeller 2 again by being guided by a stator 4. A rotational force can be continuously derived from a turbine shaft 5 by the repetition of the above flow of the fluid. This rotational force is transmitted from the turbine shaft 5 to a gear unit disposed at the output side of the torque converter unit. As is commonly known, multiple disc clutch means 6 and 7 and brake band means 21 and 22 are automatically controlled by fluid pressure supplied from associated servo means as required and cooperate with a planetary gear mechanism to provide three forward speeds and one reverse speed.

The structure of the gear unit disposed at the output side of the torque converter unit will now be described. The turbine impeller 3 is connected to the turbine shaft 5 which acts as a power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and is released by means of back-up springs. The drive plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage the internally splined portion of a clutch drum 27 of the rear clutch 7. The rear clutch 7 is engaged by means of a fluid pressure actuated piston 28 and is disengaged when fluid pressure applied to the piston 28 is released.

The intermediate shaft 8 which is splined to the hub 26 of the front clutch 6 is connected at its rear end to an input sun gear 9. The rear clutch drum 27 is fixed to a reverse sun gear 10 by a suitable locking means. The input sun gear 9 meshes with each gear 12 of a plurality of, for example, two or three planet pinions 11. The reverse sun gear 10 meshes with idler gears 15 (shown in FIG. 3) which are each rotatably mounted on a pin 14 fixed at one end to a carrier 13, and the idler gears 15 in turn mesh with gears 16 of the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14, respectively. A brake band 21 (hereinafter to be referred to as a rear brake band) encircles the carrier 13 for applying a brake to the latter, and thus the carrier 13 can be fixed against rotation and allowed to freely rotate by fastening and releasing the rear brake band 21. Similarly, a brake band 22 (hereinafter to be referred to as a front brake band) encircles the rear clutch drum 27 so that the rear clutch drum 27, hence the sun gear 10 can be fixed against rotation and allowed to freely rotate by fastening and releasing the front brake band 22. A one-way clutch 23 associated with the carrier 13 functions in a manner similar to the rear brake band 21 in low gear set forth hereunder.

With the above structure, three forward speeds and one reverse speed can be obtained by selectively actuating the elements described above in a manner as follows:

First speed—The front clutch 6 and the rear brake band 21 are actuated. (However, when the transmission is driven from the engine, the rear brake band 21 may not be actuated since the one-way clutch 23 is actuated to give the same result as that obtained with the actuation of the rear brake band 21. In this case, however, no driving force is transmitted from the output shaft 18 to the engine.) With the front clutch 6 and the rear brake band 21 so actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the gear 9 to the gears 12, thence through the gears 17 to the gear 19 on the output shaft 18 in a speed reducing relation similar to that of an ordinary gear train, thereby providing the first speed.

Second speed—The front clutch 6 is kept actuated and the front brake band 22 is actuated while releasing the rear brake band 21. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the sun gear 9 urges the pinions 11 to rotate in a direction (counterclockwise) opposite to the direction of rotation (clockwise) of the turbine shaft 5. The planet pinions 11 rotating in this direction try to rotate the idler gears 15 clockwise through the gears 16. However, due to the fact that the gear 10 meshing with the gears 15 is locked against rotation, the pinion pins 14 revolve clockwise around the gear 10. This revolving motion is imparted to the rotation of the input sun gear 9 and the gear 19 carried by the output shaft 18 which gears are coaxial with and rotate in the same direction as the turbine shaft 5. Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed—The third speed can be obtained by engaging both the front and rear clutches 6 and 7. The input sun gear 9 and the reverse sun gear 10 are rotated in unison and the whole planetary gear system is unitarily rotated so that the output shaft 18 is rotated at the rotating speed of the turbine shaft 5.

Reverse—When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the pinions 15, 16 and 17 to the gear 19 mounted on the output shaft 18 so that the output shaft 18 is rotated in the reverse direction.

HYDRAULIC ACTUATING SYSTEM

The arrangement of a hydraulic actuating system applied to the present invention is diagrammatically shown in FIGS. 4 through 10. Briefly, the hydraulic actuating system comprises a fluid pressure source 100 and a hydraulic actuating circuit 110. The hydraulic actuating circuit 110 includes a manual valve 120, a 1-2 shift means 130, a 2-3 shift means 135, a check valve 140 and fluid passages. The fluid pressure source 100 includes an oil pump 101, an oil strainer 102, a pressure regulator valve 105, a check valve 103, an oil cooler 104 and fluid passages. The fluid pressure source 100 functions to supply fluid under pressure to the torque converter, to the gears for lubricating same and to the hydraulic actuating circuit 110.

Figure 5:
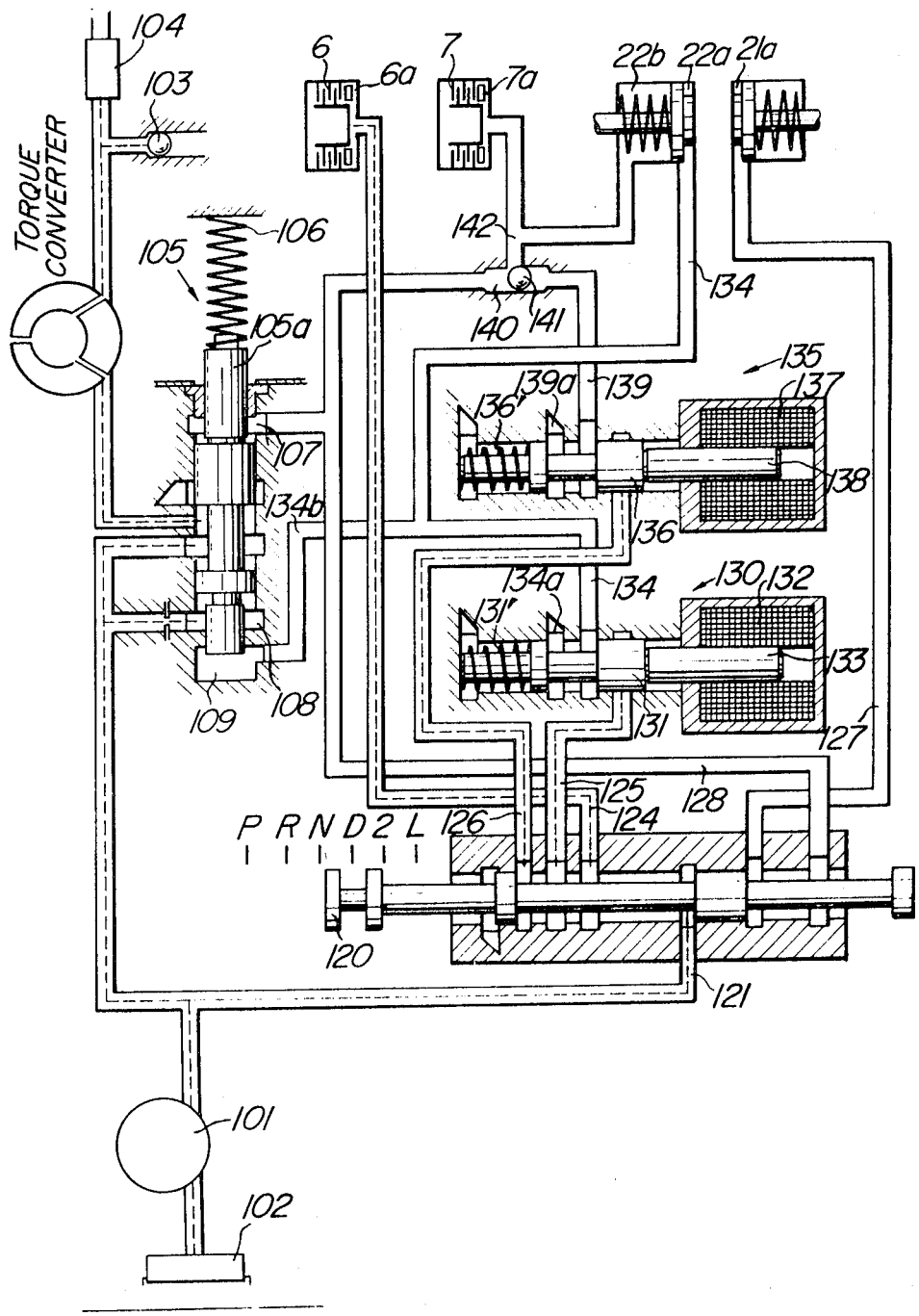

The manual valve 120 is connected with a shift lever (not shown) disposed adjacent to the driver's seat and takes one of the P, R, N, D, 2 and L positions. When now the manual valve 120 is in the N position, a fluid passage 121 is closed and valve chambers 122 and 123 are exhausted as seen in FIG. 4. At the D position of the manual valve 120, the fluid passage 121 communicates with fluid passages 124, 125 and 126 as seen in FIG. 5. The fluid passage 124 leads directly to a front clutch servo chamber 6a, and the fluid passage 125 leads to the apply side 22a of a servo for the front brake band 22 through the 1-2 shift means 130, while the fluid passage 126 leads to a rear clutch servo chamber 7a and to the release side 22b of the servo for the front brake band 22 through the 2-3 shift means 135 and the check valve 140. The 1-2 shift means 130 includes a 1-2 shift valve element 131 and a solenoid 132. One end (or the right-hand end as viewed in the drawing) of the valve element 131 is engaged by a moving core 133 of the solenoid 132. When no current is supplied to the solenoid 132, the valve element 131 is urged to its rightward position by a spring 131' engaging the other or left-hand end of the valve element 131 so that the fluid passage 125 communicates with a fluid passage 134 to supply fluid to the apply side 22a of the servo for the front brake band 22 to apply the front brake band 22. When current is supplied to the solenoid 132, the moving core 133 urges the valve element 131 to the leftward position by being actuated by the electromagnetic force of the solenoid 132 so that the communication between the fluid passages 125 and 134 is interrupted and the fluid passage 134 communicates with a pressure discharge port 134a to be exhausted thereby to release the front brake band 22. Similarly, the 2-3 shift means 135 includes a 2-3 shift valve element 136 and a solenoid 137. One end (or the right-hand end as viewed in the drawing) of the valve element 136 is engaged by a moving core 138 of the solenoid 137. When no current is supplied to the solenoid 137, the valve element 136 is urged to its rightward position by a spring 136' engaging the other or left-hand end of the valve element 136 so that the fluid passage 126 communicates with a fluid passage 139 to force a check ball element 141 of the check valve 140 toward the fluid passage 128 to block the fluid passage 128. As a result, the fluid passage 139 communicates with a fluid passage 142 to supply fluid to the rear clutch servo chamber 7a and to the release side 22b of the servo for the front brake band 22 to as to engage the rear clutch 7 and release the front brake band 22. When current is supplied to the solenoid 137, the valve element 136 is urged leftward so that the communication between the fluid passages 126 and 139 is interrupted and the fluid passage 139 communicates with a pressure discharge port 139a to be exhausted.

In the first speed at the drive range position or D position—1st speed shown in FIG. 5, both the solenoids 132 and 137 are energized and the front clutch 6 is solely engaged by the supply of fluid to the front clutch servo chamber 6a through the fluid passage 124. Accordingly, when the transmission is driven from the engine, the one-way clutch 123 is engaged to lock the carrier 13 against rotation so that the first speed can be obtained. In this case, however, no driving force can be transmitted from the output shaft 18 to the engine since a freewheeling condition appears.

Figure 6:
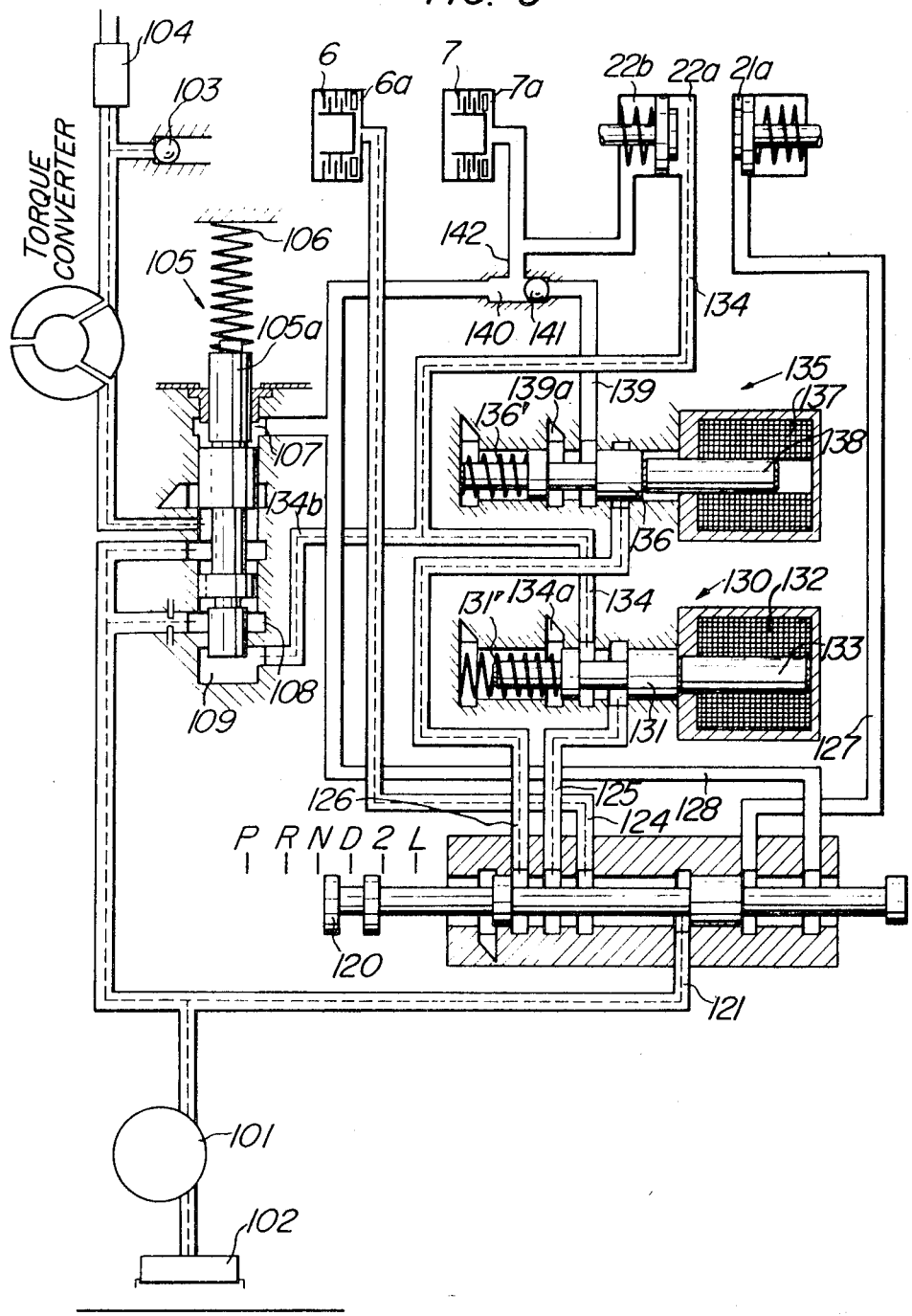

In the second speed at the drive range position or D position—2nd speed shown in FIG. 6, the fluid passage 124 leading to the front clutch servo chamber 6a is kept pressurized and the solenoid 132 for the 1-2 shift valve element 131 is de-energized with the result that the fluid passage 125 communicates with the fluid passage 134 to supply fluid to the apply side 22a of the servo for the front brake band 22 to apply the front brake band 22. Thus, the second speed can be obtained.

Figure 7:
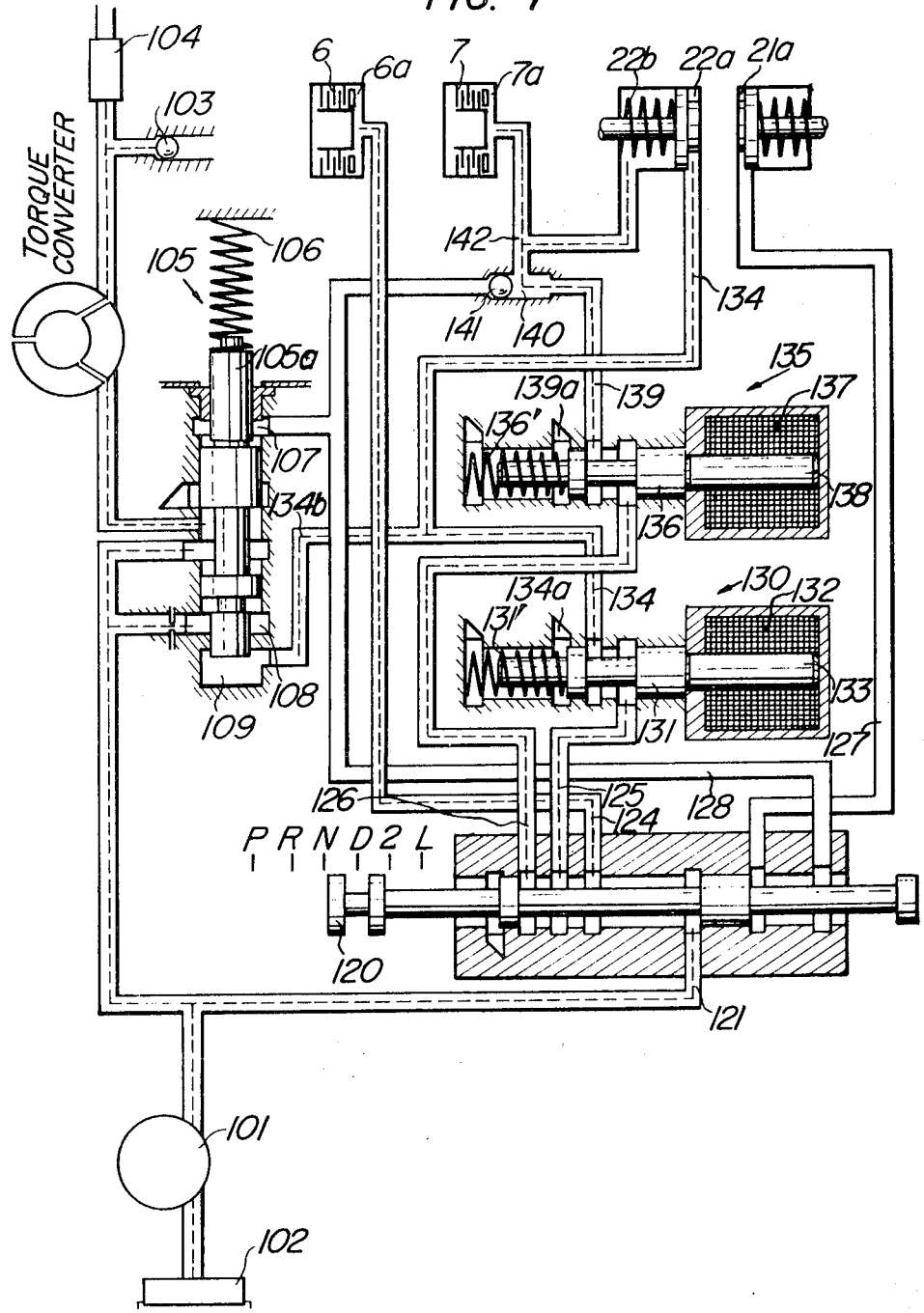

In the third speed at the drive range position or D position—3rd speed shown in FIG. 7, the solenoid 137 for the 2-3 shift valve element 136 is de-energized in addition to the previous de-energization of the solenoid 132 in the D position—2nd speed with the result that the fluid passage 126 communicates with the fluid passage 139 to supply fluid to the rear clutch servo chamber 7a to engage the rear clutch 7 while releasing the front brake band 22. Thus, the third speed can be obtained.

Figure 8:
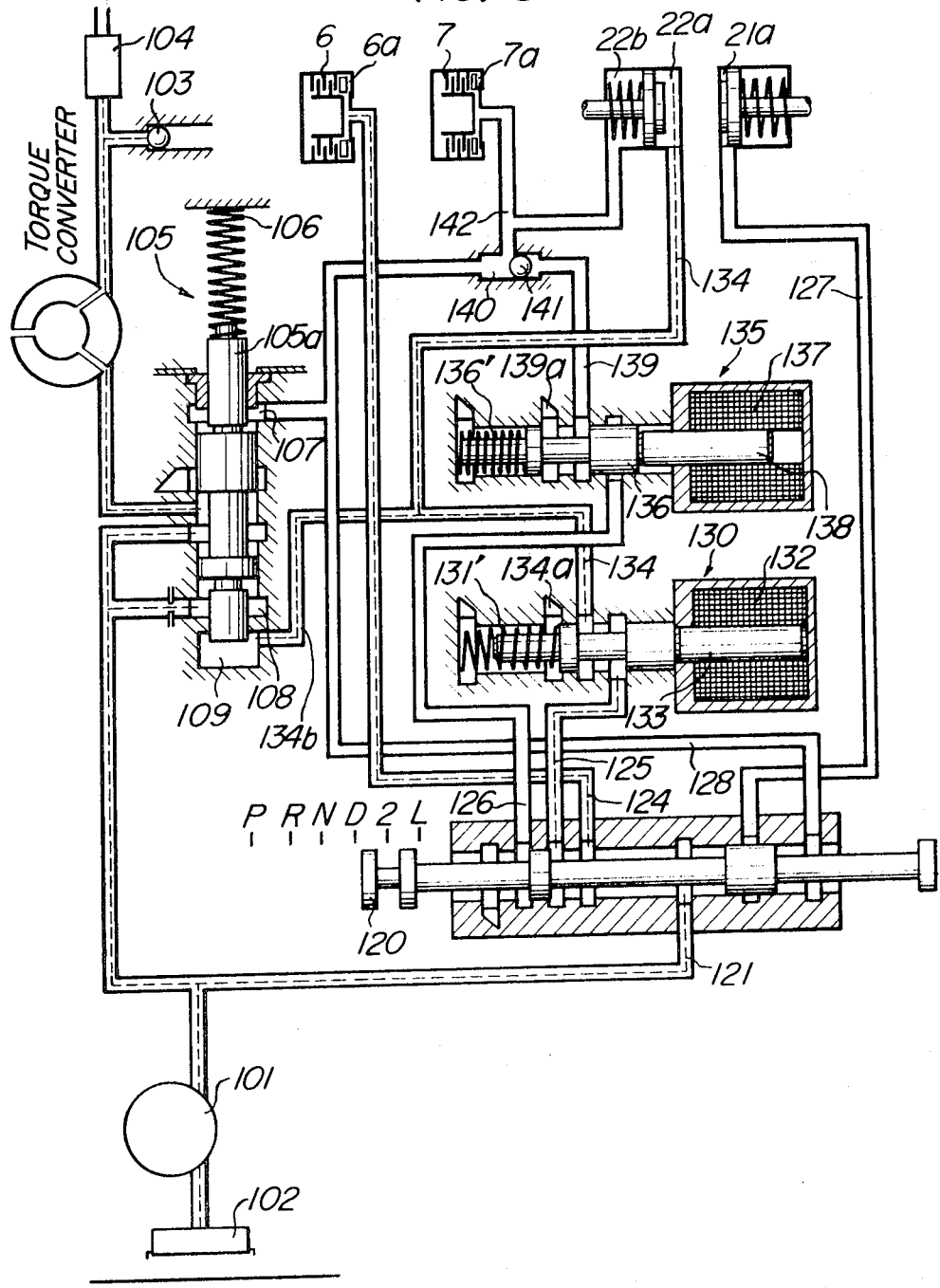

When the manual valve 120 is urged to the 2 position shown in FIG. 8, the fluid passage 126 leading to the 2-3 shift means 135 is exhausted and the fluid passages 124 and 125 communicate solely with the fluid pressure source 100. Accordingly, it is impossible to obtain the third speed regardless of the de-energization of the solenoid 137 for the 2-3 shift valve element 136 and the first and second speeds can be obtained depending on the energization and de-energization of the solenoid 132 for the 1-2 shift valve element 131.

Figure 9:
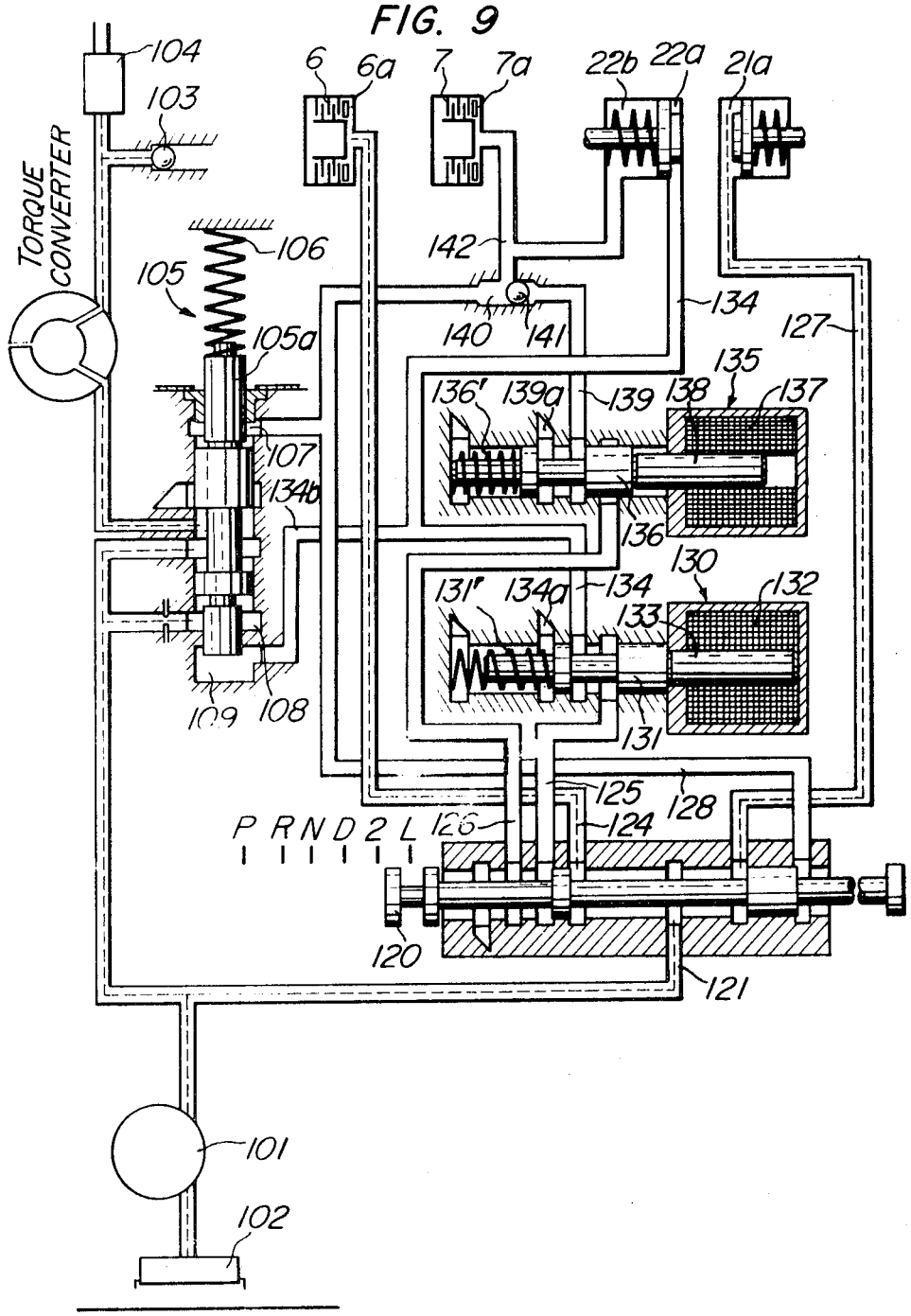

When the manual valve 120 is urged to the L position shown in FIG. 9, the fluid passages 125 and 126 are exhausted and the fluid passages 124 and 127 communicate with the fluid pressure source 100. As a result, fluid is supplied to the front clutch servo chamber 6a and to the apply side 21a of the servo for the front brake band 21 to engage the front clutch 6 and apply the rear brake band 21. Thus, the first speed can be obtained. The first speed in this case differs from the first speed in the D position in that the rear brake band 21 is applied to provide for transmission of the driving force from the output shaft 18 to the engine thereby permitting application of the engine braking.

Figure 10:
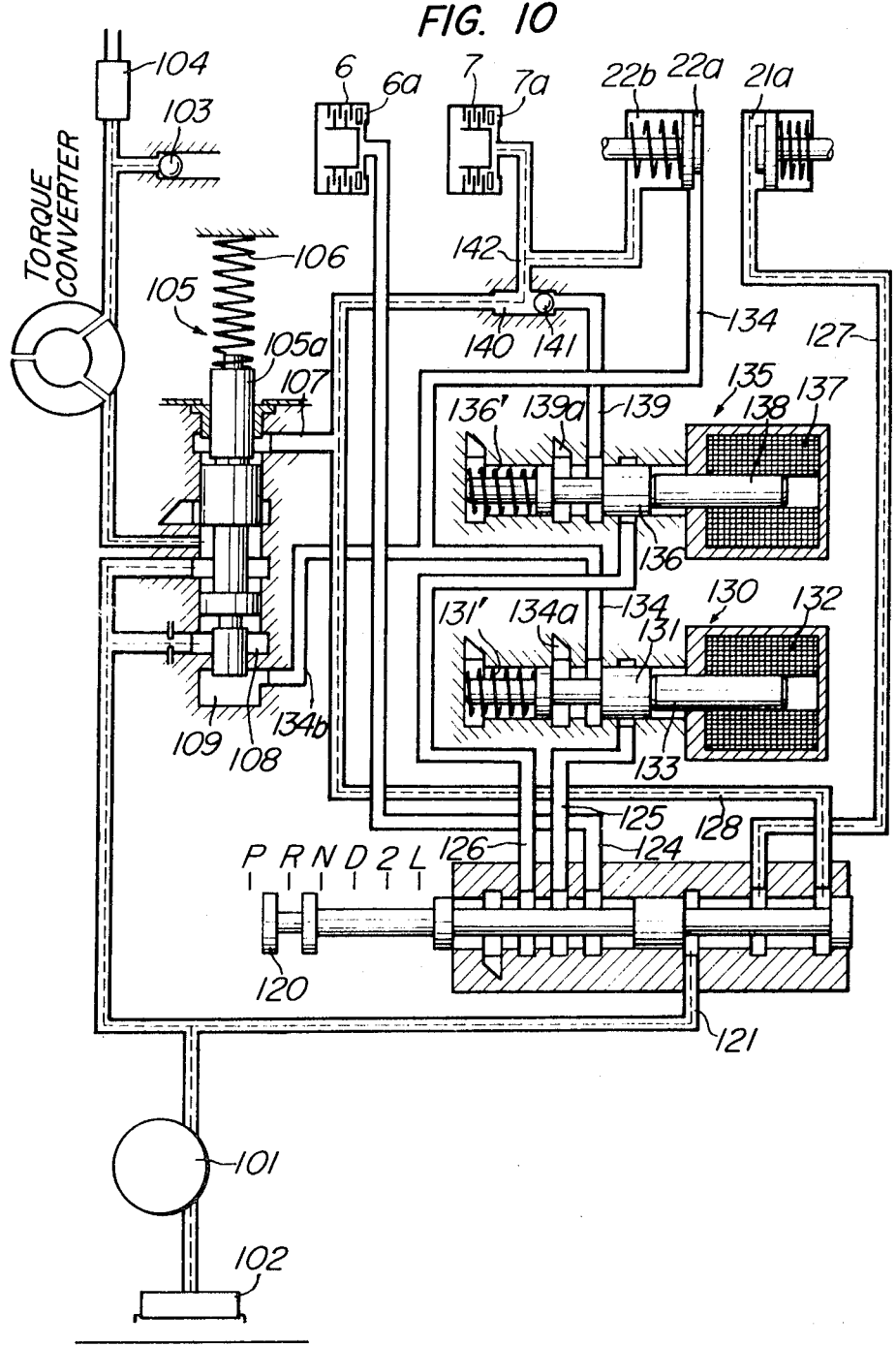

When the manual valve 120 is moved to the R position shown in FIG. 10, the fluid passages 124, 125 and 126 are exhausted and the fluid passages 127 and 128 communicate with the fluid pressure source 100. As a result, fluid is supplied to the rear clutch servo chamber 7a and to the apply side 21a of the servo for the rear brake band 21 to engage the rear clutch 7 and apply the rear brake band 21. Thus, the reverse drive condition for the vehicle can be obtained.

It will be understood from the foregoing description that the hydraulic actuating system in the present invention is featured by the fact that it comprises the combination of a novel hydraulic circuit arrangement and biasing means in the form of the springs 131' and 136' for biasing the 1-2 shift valve element 131 and the 2-3 shift valve element 136 to the upshift position in response to de-energization of the respective solenoids 132 and 137. The circuit arrangement of the hydraulic actuating system is such that, in the D position—1st speed, D position—2nd speed and D position—3rd speed of the manual valve 120, fluid pressure from the fluid pressure source 100 is supplied to the front clutch servo chamber 6a for the front clutch 6 through the fluid passage 124, to the apply side 22a of the servo for the front brake band 22 through the fluid passage 125 and the 1-2 shift means 130, and to the rear clutch servo chamber 7a for the rear clutch 7 and to the release side 22b of the servo for the front brake band 22 through the fluid passage 126 and the 2-3 shift means 135, respectively. In the 2 position of the manual valve 120, the fluid passage 126 leading to the 2-3 shift means 135 is exhausted and the fluid passages 124 and 125 communicate with the fluid pressure source 100, while in the L position of the manual valve 120, the fluid passage 125 leading to the 1-2 shift means 130 is further exhausted and the fluid passage 124 leading to the front clutch servo chamber 6a for the front clutch 6 and the fluid passage 127 leading to the apply side 21a of the servo for the rear brake band 21 communicate with the fluid pressure source 100. By virtue of the above combination, even when the power supplied from the electrical power source to the shift signal control system is interrupted, the manual valve 120 may be urged to the L position for obtaining the first speed, to the 2 position for obtaining the second speed and to the D position for obtaining the third speed.

It will thus be understood that the 1-2 shift means 130 and the 2-3 shift means 135 are operated to carry out the automatic speed changing operation and this is accomplished by selectively energizing and de-energizing the solenoids 132 and 137. The selective energization and de-energization of the solenoids 132 and 137 are carried out under the control of a unique shift signal control system which will be described in detail hereunder.

SHIFT SIGNAL CONTROL SYSTEM

The shift signal control system which is the essential feature of the present invention includes a throttle position detecting or responsive circuit 320, an output shaft r.p.m. detecting circuit 201, a 1-2 shift point computer circuit 358, a 2-3 shift point computer circuit 361, and a safety circuit 363.

Figure 12A:
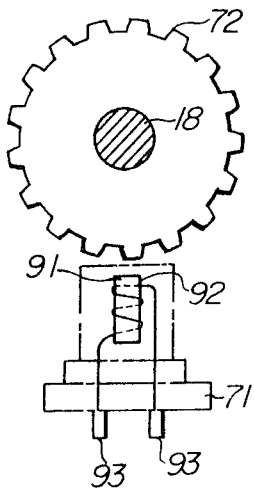
FIGS. 12a and 12b are a side elevational view and a front elevational view, respectively, of an r.p.m. detector preferably used in the shift signal control system.
Figure 12B:
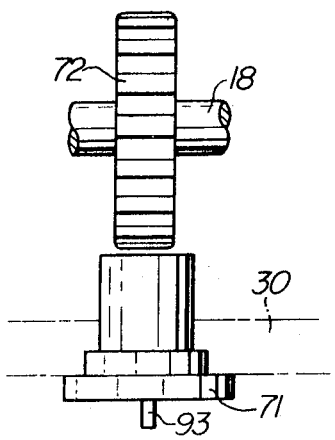

The output shaft r.p.m. detecting circuit 201 includes an output shaft r.p.m. detecting means 70 and a digital-analog converter 310. The output shaft r.p.m. detecting means 70 has a structure as shown in FIGS. 12a and 12b and is composed of an r.p.m. detector 71 mounted on the transmission housing 30 and a toothed disc 72 secured integrally to the output shaft 18. The toothed disc 72 has a number of teeth of $n$, for example, $n = 32$ so that the r.p.m. detector 71 detects an electrical signal $S$ having a frequency which is $n$ times the r.p.m. $N$ of the output shaft 18. Thus, $S = n \times N$.

Knowing the r.p.m. $N$ of the output shaft 18 enables the speed of the vehicle to be known. The structure of the output shaft r.p.m. detecting means 70 will be described in more detail with reference to FIGS. 12a and 12b. As seen in a side elevation in FIG. 12a, the toothed disc 72 which is secured at its center of rotation to the output shaft 18 is a discal plate of magnetic material having 32 equally spaced teeth formed along its circumference, and the r.p.m. detector 71 is mounted on the housing 30 at a position closely adjacent to the toothed disc 72 in a direction which is diametrically opposite to the latter. The r.p.m. detector 71 is composed of a permanent magnet 91 and a coil 92 wound around the permanent magnet 91. The permanent magnet 91 and the coil 92 are housed in a suitable casing of non-magnetic material and the casing is mounted on the transmission housing 30 so that one end of the permanent magnet 91 is disposed in close proximity to the outer periphery of the toothed disc 72. As the tooth portion of the toothed disc 72 passes through the magnetic field of the permanent magnet 91 as a result of rotation of the toothed disc 72, a variation takes place in the leakage flux of the permanent magnet 91 so that an electromotive force is produced in the coil 92. In the case of the illustrated example, one complete rotation of the toothed disc 72 produces 32 voltage pulses. As described hereinbefore, a voltage signal at an A.C. voltage $S$ is having a frequency $n \times N$ is generally obtained when the toothed disc 72 having n teeth rotates at a number of revolutions $N$ per unit time. The voltage signal so produced appears across output terminals 93. It will be apparent to those skilled in the art that, in lieu of the above manner of vehicle speed detection, a small-sized generator may be mounted in coaxial relation with the driven gear operatively connected with the speedometer cable and the output from the generator may be utilized for the vehicle speed detection.

Figure 13:
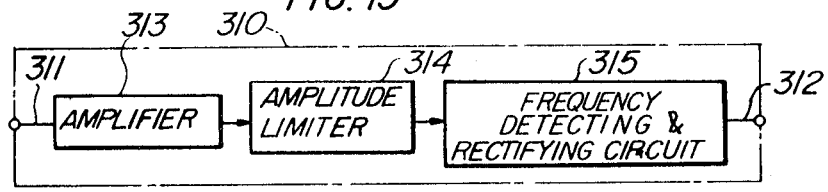
FIG. 13 is a block diagram showing the structure of a digital-analog converter preferably used in the shift signal control system.

The output voltage signal $S$ delivered from the output shaft r.p.m. detecting means 70 is supplied to the digital-analog converter 310 through a lead 311. The digital-analog converter 310 converts the A.C. signal or digital signal $S$ into a D.C. signal or analog signal. The digital-analog converter 310 has a structure as shown in FIG. 13. The input voltage signal $S$ is supplied by the lead 311 to an amplifier 313 in which the amplitude of the signal is increased, and then the amplitude of the signal $S$ is limited to a fixed value by an amplitude limiter 314. The A.C. voltage is then converted into a D.C. voltage by a frequency detecting and rectifying circuit 315, and the D.C. voltage is led out by a lead 312. This voltage is an analog voltage proportional to the r.p.m. of the output shaft 18.

Figure 14:
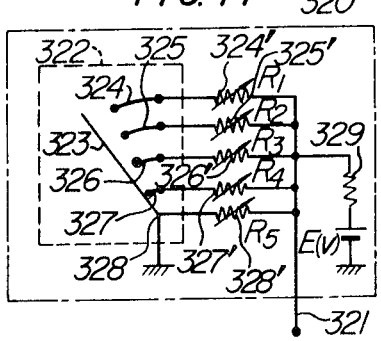
FIG. 14 is a circuit diagram showing the structure of a throttle position responsive circuit preferably used in the shift signal control system for obtaining a throttle position responsive signal.

The throttle position responsive circuit 320 has a structure as shown in FIG. 14. The reference numeral 322 designates a multi-contact switch which is responsive to the position of the throttle valve in the carburetor, or in other words, responsive to the degree of depression of the accelerator pedal. (This switch may respond to a displacement of a member responsive to the negative pressure in the air intake pipe since the switch is a means for detecting an engine torque responsive signal.) The multi-contact switch 322 has a movable contact 323 and a plurality of stationary contacts 324, 325, 326 and 327. The switch 322 is so constructed that the movable contact 323 is successively released from contact with the stationary contacts 324, 325, 326 and 327 as the opening $S_\theta$ of the throttle valve is successively increased to $S_{\theta(1)}$, $S_{\theta(2)}$, $S_{\theta(3)}$ and $S_{\theta(4)}$. The movable contact 323 is grounded at one end thereof. The stationary contacts 324, 325, 326 and 327 are connected at one end to respective variable resistors 324', 325', 326' and 327', while one end of a variable resistor 328' is grounded. The variable resistors 324', 325', 326', 327' and 328' are connected at the other end in common to a lead 321. A resistor 329 is connected at one end to the lead 321, and a fixed voltage E is applied to the other end of the resistor 329. The variable resistor 328' is so adjusted that a voltage $E(5)$ appears on the lead 321 when $S_\theta = S_{\theta(5)}$ due to the full opening of the throttle valve in the carburetor. Then, when the throttle valve opening is reduced to $S_{\theta(4)}$, the movable contact 323 engages solely with the stationary contact 327. The variable resistor 327' is so adjusted that an output $E(4)$ appearing on the lead 321 in such a position of the switch 322 is given by $$\frac{R_4 \| R_5}{R_4 \| R_5 + R} \times E = E(4),$$

where R, $R_4$ and $R_5$ are the resistance of the resistor 329, the resistance of the variable resistor 327' and the resistance of the variable resistor 328', respectively, and $R_4 \| R_5$ is the resistance given when the variable resistors 327' and 328' are connected in the circuit in parallel with each other. The variable resistor 326' is so adjusted that an output $E(3)$ appearing on the lead 321 in response to the throttle valve opening of $S_{\theta(3)}$ is given by $$\frac{R_5 \| R_4 \| R_3}{R_5 \| R_4 \| R_3 + R} \times E = E(3),$$

where $R_5$ is the resistance of the variable resistor 326'. Similarly, the variable resistors 325' and 324' are so adjusted that the outputs appearing on the lead 321 in response to the throttle valve openings of $S_{\theta(1)}$ and $S_{\theta(2)}$ are given by $E(2)$ and $E(1)$, respectively. Thus, the voltages $E(1)$, $E(2)$, $E(3)$, $E(4)$ and $E(5)$ appear on the lead 321 in response to the throttle valve opening $S_\theta$ of $S_{\theta(1)}$, $S_{\theta(2)}$, $S_{\theta(3)}$, $S_{\theta(4)}$ and $S_{\theta(5)}$, respectively. In other words, a stepped signal voltage $E(N)$ ($N = 1, 2, 3, 4, 5$) is delivered from the circuit 320 to the lead 321 depending on the opening of the throttle valve. While the switch 322 is shown as having four stationary contacts for obtaining five different outputs, it is apparent that the number of the stationary contacts may be further increased in order to obtain a more complex stepped signal.

Figure 15:
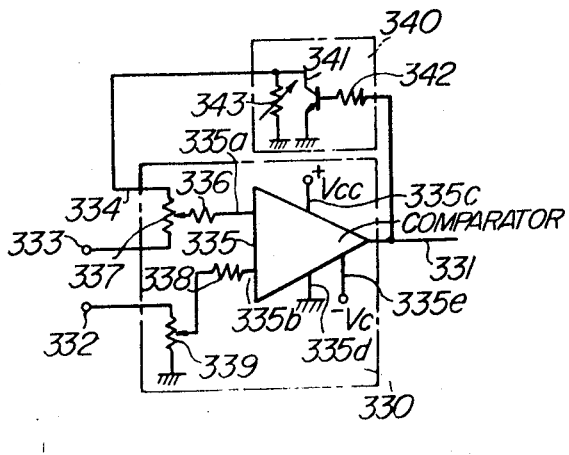
FIG. 15 is a circuit diagram showing the structure of a discriminating circuit and an associated feedback circuit preferably used in the shift signal control system.

The 1-2 shift point computer circuit 358 includes a discriminating circuit 330, a feedback circuit 340 and an amplifier 350. The discriminating circuit 330 and the feedback circuit 340 have a structure as shown in FIG. 15. The discriminating circuit 330 includes a comparator 335 of any suitable conventional type such as one sold under the trade code name of μpc 71 by Nippon Electric Co., Ltd. or SN72710N supplied by Texas Instruments Co., Ltd. As input resistor 336 is connected at one end to an input terminal 335a of the comparator 335 and at the other end to the movable arm of a variable resistor 337. The variable resistor 337 is connected across the input terminals 333 and 334 of the discriminating circuit 330. A resistor 338 is connected at one end to an input terminal 335b of the comparator 335 and at the other end to the movable arm of a variable resistor 339. The variable resistor 339 is connected at one end to the input terminal 332 of the discriminating circuit 330 and is grounded at the other end. Terminals 335c, 335d and 335e of the comparator 335 are connected to the positive terminal of a power source, to ground and to the negative terminal of the power source, respectively. The feedback circuit 340 includes an NPN transistor 341, a resistor 342 and a variable resistor 343. The NPN transistor 341 has its emitter grounded and its base connected to the output lead 331 of the discriminating circuit 330 through the resistor 342. The collector of the transistor 341 is connected to the fixed terminal of the variable resistor 343 and the junction point therebetween is connected to the input terminal 334 of the discriminating circuit 330. The variable contact of the variable resistor 343 is grounded.

In operation, assuming that a voltage or "1" appears on the output lead 331 when no signal is supplied to the input terminals 332 and 333 of the discriminating circuit 330, then a base current is supplied through the resistor 342 to the transistor 341 in the feedback circuit 340 with the result that the transistor 341 conducts and the variable resistor 343 is shorted thereacross. Then, when a voltage signal $E(N)$ ($N=1$, 2, 3, 4, 5) representative of the throttle position and a voltage signal $En$ representative of the output shaft r.p.m. are applied to the respective input terminals 332 and 333 of the discriminating circuit 330, a voltage $En' = (R_b)/(R_a + R_b) \cdot En$ appears at the movable arm of the variable resistor 337, where $R_a$ is the resistance between the input terminal 333 and the movable arm of the variable resistor 337 and $R_b$ is the resistance between the movable arm of the variable resistor 337 and the collector of the transistor 341 in the feedback circuit 340, while a voltage $E(N)'$ appears at the movable arm of the variable resistor 339 and is given by $E(N)' = (R_e)/(R_d + R_e) \cdot E(N)$, where $R_d$ is the resistance between the movable arm of the variable resistor 339 and the input terminal 332 and $R_e$ is the resistance between the movable arm of the variable resistor 339 and ground.

The voltage $En'$ is applied to the input terminal 335a of the comparator 335 through the resistor 336, and the voltage $E(N)'$ is applied to the input terminal 335b of the comparator 335 through the resistor 338. The comparator 335 compares $E(N)'$ with $En'$. Thus, when $En' - E(N)'$ is positive, no signal voltage or signal "0" is delivered from the comparator 335 to the output lead 331, while when $En' - E(N)'$ is negative, a signal voltage or signal "1" is delivered from the comparator 335 to appear on the output lead 331. The resistors 336 and 338 are protective resistors which protect the comparator 335 against any large inputs that may be applied to the input terminals of the comparator 335. The comparator 335 may be composed of a differential amplifier and a Zener diode or a Schmitt circuit. When "0" or no output voltage appears on the output lead 331 of the discriminating circuit 330 due to $En' - E(N)' > 0$, no base current is supplied to the base of the transistor 341 in the feedback circuit 340 through the resistor 342 thereby to turn off the transistor 341. Therefore, the potential at the input terminal 335a of the comparator 335 is now given by $En'' = (R_b + R_c)/(R_a + R_b + R_c) \cdot En$ (where $R_c$ is the resistance of the variable resistor 343) which is greater than $En'$ or $En'' > En'$ in spite of the fact that $En$ remains the same. Thus, the output appearing on the output lead 331 of the comparator 335 turns from "0" to "1" at a smaller value of $En$ (that is, at a lower vehicle speed) than when the output turns from "1" to "0." In other words, the amount of modification of the signal $En$ representative of the output shaft r.p.m. by the resistances is varied by means of the feedback circuit 340 depending on whether the output appearing on the output lead 331 of the discriminating circuit 330 is "0" or "1" so as thereby to vary the discriminating condition of the discriminating circuit 330. By this method, a stable signal appears on the output lead 331 and no hunting between on and off would occur.

It will thus be seen that the relation $En = A \, E(N)$ holds between the signal $En$ representative of the output shaft r.p.m. and the signal $E(N)$ representative of the throttle position when the output signal appearing on the output lead 331 of the discriminating circuit 330 is changed from "1" to "0," and the relation $En = A'E(N)$ holds between these two signals when the output signal appearing on the output lead 331 is changed from "0" to "1." These two equations can be computed by suitably setting the resistances of the variable resistors 337, 339 and 343 in the discriminating circuit 330 and feedback circuit 340 constituting the 1–2 shift point computer circuit 358. Thus, the output signal appearing on the output lead 331 varies from "1" to "0" or the output voltage ceases to appear thereon when $En$ is increased to make a shift to the right-hand side of the curve $En = A \, E(N)$ in FIG. 16. When $En$ is decreased in the absence of the output voltage until the relation $En \leq A'E(N)$ is thereby achieved, the signal voltage appears on the output lead 331 again.

The amplifier 350 is a conventional one, and its sole function is the amplification of the output signal from the discriminating circuit 330 for energizing the solenoid 132. The amplifier 350 is unnecessary when the output signal from the discriminating circuit 330 can satisfactorily energize the solenoid 132. The solenoid 132 is well known in the art and any description of it is unnecessary. It is apparent that an alternative circuit arrangement may be employed so that "0" is delivered from the discriminating circuit 330 to appear on the output lead 331 when $En - E(N) < 0$, while "1" appears on the output lead 331 when $En - E(N) > 0$ and the solenoid 132 is energized in response to the appearance of "1" on the output lead 331.

The 2–3 shift point computer circuit 361 includes a discriminating circuit 330', a feedback circuit 340' and an amplifier 356. The functions of the elements 330', 340' and 356 constituting the 2–3 shift point computer circuit 361 are similar to those of the elements 330, 340 and 350 constituting the 1–2 shift point computer circuit 358 described above. The 2–3 shift point computer circuit 361 is adapted to compute the relation $En = B \, E(N)$ between the signal $En$ representative of the output shaft r.p.m. and the signal $E(N)$ representative of the throttle position when the output signal appearing on the output lead 331' varies from "1" to "0" or no voltage appears thereon and to compute the relation $En = B' \, E(N)$ between these two signals when the signal appearing on the output lead 331' varies from "0" to "1" or a voltage appears thereon. Referring to FIG. 16, when the signal $En$ representative of the output shaft r.p.m. is increased to such an extent that the relation $En \geq BE(N)$ is satisfied, no signal voltage appears on the output lead 331', that is, a variation from "1" to "0" takes place. As $En$ is subsequently decreased to such an extent that the relation $En \geq B'E(N)$ is satisfied, a voltage appears on the output lead 331' and is amplified by the amplifier 356 to such an magnitude which is enough for energizing the solenoid 137.

The safety circuit 363 which the essential part of the present invention includes a reference voltage means 360, a discriminating circuit 370 for comparing a reference voltage supplied from the reference voltage means 360 with a signal $En$ representative of the output shaft r.p.m., and a switching circuit 380 for interrupting the power supplied to the solenoid 137 in response to a signal delivered from the discriminating circuit 370. The reference voltage means 360 is adapted to supply a reference voltage $Ec$ which is higher than the maximum value of $En$ given by the relation $En = B \, E(N)$ as seen in FIG. 16 and may represent a vehicle speed of, for example, 100 Km/hour. The reference voltage $Ec$ may be obtained by dividing by means of a resistor a fixed voltage derived from a stabilized power source. The reference voltage means 360 supplying the reference voltage $Ec$ is connected by a lead 365 to an input terminal 374 of the discriminating circuit 370 having a structure as shown in FIG. 17. The signal $En$ representative of the output shaft r.p.m. is applied to another input terminal 313 of the discriminating circuit 370. These two signals are compared with each other in a comparator 377 so that a signal voltage appears on the output lead 371 when $Ec > En$, that is, when the vehicle speed is lower than 100 Km/hour, while no signal voltage appears on the output lead 371 when $Ec \leqq En$, that is, when the vehicle speed is higher than 100 Km/hour. The discriminating circuit 370 includes a variable resistor 372 for regulating the signal En representative of the output shaft r.p.m. and protective resistors 373 and 376 for the comparator 377. The comparator 377 has input terminal 377a and 377b connected to the respective protective resistors 373 and 376, terminals 377c and 377d connected to a stabilized power source, and a terminal 377e connected to ground.

The output signal delivered from the discriminating circuit 370 is applied to an input terminal 387 of the switching circuit 380 by the output lead 371. The switching circuit 380 has a structure as shown in FIG. 18 and includes a transistor 383 the base of which is connected to the input terminal 387 through a resistor 385 and also to ground through a resistor 386. The transistor 383 has its emitter grounded by a lead 383c and its collector connected to one end of a coil 382a of a relay 382 by a lead 383a. The other end of the coil 382a is connected to an input terminal 384 which is connected to a power source. A diode 382c is connected across the ends of the coil 382a so as to absorb the counter electromotive force generated in the coil 382a. One contact 382b of the relay is connected to the output lead 357 of the amplifier 356, and the opposite contact 382d is connected to a lead 381 leading to the solenoid 137. The contact 382b is urged toward the contact 382d when the coil 382a is energized. When the vehicle speed is lower than 100 Km/hour, an input signal or signal "1" is applied to the input terminal 387 of the switching circuit 380 thereby turning on the transistor 383. Since the transistor 383 conducts, the relay 382 is energized to bring the contact 382b into contact with the opposite contact 382d thereby connecting the output lead 357 of the amplifier 356 to the output lead 381 of the switching circuit 380 leading to the solenoid 137. That is, the output of the amplifier 356 is connected to the solenoid 137. When the amplifier 356 is delivering an output signal in the above state, the solenoid 137 is energized, while when the amplifier 356 is not delivering any output signal, the solenoid 137 is not energized. In other words, the solenoid 137 is normally energized or de-energized depending on the presence or absence of the output signal from the discriminating circuit 330'.

When the vehicle speed exceeds 100 Km/hour and no input signal is applied to the input terminal 387 of the switching circuit 380, that is, when $Ec \leqq En$, the transistor 383 is cut off and the contact 382b is urged away from contact with the opposite contact 382d. In this state, the solenoid 137 is kept de-energized irrespective of the presence or absence of the output signal from the amplifier 356. It will thus be seen that, as far as the solenoid 137 is continuously kept de-energized in the manner described above, the hydraulic actuating circuit is kept in the state of the third speed shown in FIG. 7 and no downshift to the second speed can occur thereby ensuring the stability and safety of the drive during running at high speed. It will be recalled that the hydraulic actuating circuit employed in the present invention is so arranged that the above operation is not affected by the energization and de-energization of the 1-2 shift solenoid 132.

It will be understood from the foregoing description that the present invention includes a safety circuit which acts to disconnect the solenoid 137 from the amplifier 356 thereby to interrupt the supply of the signal from the discriminating circuit 330' to the solenoid 137 when the vehicle is running in third gear at a speed higher than a predetermined setting such as 100 Km/hour. Thus, the automatic transmission can be prevented from being downshifted even when an erratic shift signal may be delivered from the discriminating circuit due to trouble occurring in the discriminating circuit in the automatic shift control system or when an output signal may be delivered from the amplifier in the absence of any shift signal due to trouble occurring in the amplifier. This leads to the advantages that excessive engine braking and overrunning of the engine can be prevented, improvements in the stability and safety of drive of the vehicle can be attained, the durability of the engine can be enhanced, and any trouble due to excessive rotation of engine auxiliaries can be prevented.

The primary purpose of the present invention can be similarly attained by disposing the switching circuit 380 in the safety circuit 363 at the input side of the amplifier 356 or of the discriminating circuit 330', and this is also included in the scope of the present invention. However, the disposition of the switching circuit 380 immediately before the solenoid 137 as shown in the illustrated embodiment is preferred in order to more positively attain the purpose of the present invention and to obtain the various merits described above.

While a preferred embodiment of the present invention has been described by way of example, it will be apparent to those skilled in the art that the present invention is in no way limited to such a specific embodiment and many changes and modifications may be made therein without departing from the scope of the appended claims.

I claim:

1. In an automatic transmission for an engine-driven vehicle having a hydraulic torque converter, a gear unit and frictionally engaging means for accomplishing the selective meshing engagement of the gears in said gear unit, an automatic shift control system comprising
   means for producing ratio changes by selectively actuating said frictionally engaging means,
   means for generating at least one electrical signal for establishing the shifting conditions including means for generating an electrical signal representing vehicle speed,
   at least one discriminating circuit for generating a shift signal for actuating said ratio-change producing means when the electrical signals generated by said signal generating means satisfy a predetermined condition, and
   at least one safety circuit means for forcedly maintaining said gear unit in its high gear ratio when said vehicle speed exceeds a predetermined setting higher than the upshifting speed of said gear unit.

2. An automatic shift control system as claimed in claim 1 in which said safety circuit means includes means for producing a reference voltage, a second discriminating circuit having a comparator circuit for comparing the said speed representative electrical signal with said reference voltage, and a switching circuit disposed between said first mentioned discriminating circuit and said ratio-change producing means and operated by the output of said second discriminating circuit to cut off the supply of the electrical signal from said first discriminating circuit to said ratio-change producing means when said predetermined vehicle speed setting is exceeded.

3. The shift control system of claim 1 wherein said signal generating means responsive to rotational speed comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil.

4. The shift control system of claim 3 further including a digital to analog converter electrically connected between said coil and said establishing circuit.

5. The shift control system of claim 3 wherein said ratio producing and actuating means comprises a source of pressurized liquid an a hydraulic system having at least one valve for controlling the flow of liquid within said hydraulic system and at least one hydraulic operator in liquid connection with said hydraulic system and in mechanical connection with said engaging means for operating said engaging means.

6. The shift control system of claim 5 wherein said engaging means comprises at least one clutch and said hydraulic operator comprises a servo chamber mechanically adapted to cause the engagement of said clutch.

7. The shift control system of claim 5 wherein said engaging means comprises at least one brake band and said hydraulic operator comprises a servo chamber mechanically adapted to cause the engagement of said brake band.

8. The shift control system of claim 1 wherein said signal generating means is responsive to throttle position and comprises a movable contact mechanically connected with the carburetor throttle of said vehicle, a plurality of fixed contacts arranged to engage with said movable contact, each of said fixed contacts being connected through a separate resistance to a source of electrical power, and a voltage tap line connected in common between said resistances and said power source wherein the movement of said carburetor throttle causes said movable contact to engage a varying number of fixed contacts and thus to vary the output voltage on said voltage tap line proportional to the setting of said carburetor throttle.

9. The shift control system of claim 1 wherein said discriminating means comprises a comparator having first and second input leads and an output lead, and two electrical signals are generated one of said two signals being applied to said first input lead and the other of said two signals being applied to said first input lead said comparator producing an output on said output lead only when said first signal exceeds said second signal.

10. The shift control system of claim 9 further including a feedback circuit connected between said output lead of said comparator and said first input lead thereof for adding a portion of the output signal produced by said comparator to the input signal at said first input lead whereby signals on said output lead are stabilized.

11. The shift control system of claim 9 wherein said safety circuit means comprises a second comparator which is electrically identical to the first comparator and has electrically identical input and output leads but differs from said first comparator in that a reference signal is applied to the second input lead of said second comparator whereby said second comparator produces an output only when said reference signal exceeds said first signal, and a switching circuit to which the output lead extends which is connected to said electrical operator.

12. In a shift control system for a vehicle transmission which includes a transmission gear assembly, engaging means for effecting gear shifting engagement of said transmission gear assembly, and shifting means for operating said engaging means, the improvement comprising, signal generator means for producing electrical signals representative of the operating conditions of the vehicle, a circuit connected to the output of said signal generator means for acting upon the output signals therefrom to establish a shift condition and an electrical operator connected to the output of said establishing circuit for actuating said shifting means and safety circuit means for controlling said electrical operator and maintaining said shifting means in its high speed position when the rotational speed of the output shaft of said transmission exceeds a predetermined setting regardless of the output from said establishing circuit.

13. In an automatic transmission for an engine-driven vehicle having a hydraulic torque converter, a gear unit and frictionally engaging means for accomplishing the selective meshing engagement of the gears in said gear unit, an automatic shift control system, comprising:
  means for producing ratio changes by selectively actuating said frictionally engaging means,
  means for generating electrical signals for establishing the shifting conditions including means for generating an electrical signal responsive to the engine torque or throttle position and means for generating an electrical signal responsive to the r.p.m. of the output shaft or vehicle speed,
  at least one discriminating circuit for generating a shift signal for actuating said ratio-change producing means when the electrical signals generated by said signal generating means satisfy a predetermined condition, and
  at least one safety circuit means for disconnecting said ratio-change producing means from said discriminating circuit when the output shaft r.p.m. or vehicle speed exceeds a predetermined setting to cut off the supply of the electrical signal from said discriminating circuit to said ratio-change producing means so as thereby to forcedly maintain said frictionally engaging means in the high speed position,
  said safety circuit means including means for producing a reference voltage, a second discriminating circuit having a comparator circuit for comparing the electrical signal from said output shaft r.p.m. responsive signal generating means with said reference voltage, and a switching circuit disposed between said first discriminating circuit and said ratio-change producing means and operated by the output of said second discriminating circuit to cut off the supply of the electrical signal from said first discriminating circuit to said ratio-change producing means when the output shaft r.p.m. exceeds the predetermined setting.

14. The shift control system of claim 13 wherein said signal generating means comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil, and a movable contact mechanically connected with the carburetor throttle of said vehicle, a plurality of fixed contacts arranged to engage with said movable contact each of said fixed contacts connected through a separate resistance to a source of electrical power and a voltage tap line connected in common between said resistances and said power source wherein the movement of the carburetor throttle causes said movable contact to engage a varying number of said contacts and thus to vary the output voltage on said voltage tap line proportional to the carburetor throttle setting.

* * * * *